United States Patent Office 3,206,457
Patented Sept. 14, 1965

3,206,457
3 - AMINOALKYL ETHERS OF 17 - OXYGENATED ANDROST-5-EN-3-OLS AND 20 - OXYGENATED PREGN-5-EN-3-OLS, AND 5α,6-DIHYDRO COMPOUNDS CORRESPONDING
Charles W. Marshall, Skokie, Ill., assignor to G. D. Searle & Co., Chicago, Ill., a corporation of Delaware
No Drawing. Filed Nov. 16, 1960, Ser. No. 69,555
11 Claims. (Cl. 260—239.5)

This invention relates to 3-aminoalkyl ethers of 17-oxygenated androst-5-en-3-ols and 20-oxygenated pregn-5-en-3-ols, 5,6-dihydro compounds otherwise identical therewith, and processes whereby these products can be manufactured. More particularly, this invention relates to compounds of the formula

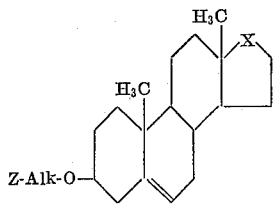

wherein Z represents an optionally-alkylated amino radical, Alk represents an alkylene radical, and X represents a carbonyl radical or radical of the formula

in which R represents a hydroxy, acetyl, or 1-hydroxyethyl (—CHOHCH$_3$) radical. Additionally, this invention relates to compounds identical with those hereinabove enformulated except for the absence of a 5(6) double bond. Those skilled in the art will recognize that when X in the formula represents a carbonyl radical or R in the formula represents a hydroxy radical, the compounds depicted are androstane derivatives, whereas when R represents an acetyl or hydroxyethyl radical, they are pregnane derivatives.

The symbol Z subsumes both the primary amino radical, —NH$_2$, and secondary and tertiary amino radicals wherein 1 or 2 alkyl or hydroxyalkyl groupings are present. Among the latter groupings, especially lower alkyl and hydroxy(lower alkyl) radicals are preferred. Illustrative of lower alkyl radicals are methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like —C$_n$H$_{2n+1}$ groupings wherein $n$ represents a positive integer amounting to less than 9.

When the amino radical represented by Z is substituted by 1 or 2 alkyl or hydroxyalkyl groupings, the substituent groupings can be either discrete, as for example when Z designates a radical of the formula

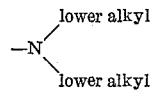

or they can be joined together directly or through oxygen or a second nitrogen to compose cyclic amino radicals optimally comprising at least 4 carbon atoms. Illustrative of the cyclic amino radicals contemplated by Z are pyrrolidino, 2-methylpyrrolidino, 2,5-dimethylpyrrolidino, 3-methyl-4-ethylpyrrolidino, piperidino, 3-methylpiperidino, 2,6-dimethylpiperidino, morpholino, piperazino, 4-methylpiperazino, 4-hydroxyethylpiperazino, and the like monovalent 5- and 6-membered heterocyclic groupings. The terminal "ino" in the radical names set forth denotes attachment of the radicals thus identified via nitrogen.

The alkylene radicals represented by Alk, like the alkyl and hydroxyalkyl groupings comprehended when Z represents a secondary or tertiary amino radical, are most desirably of lower order. Typical of lower alkylene radicals are methylene, ethylene, trimethylene, 1,2- propylene, 2,2-dimethyl-1,3-propylene, tetramethylene, and homologous, bivalent, saturated, acyclic, straight- or branched-chain hydrocarbon groupings embracive of fewer than 9 carbon atoms.

Equivalent to the above-described amino ethers for purposes of the present invention are their non-toxic acid addition salts, the composition of which is depicted by

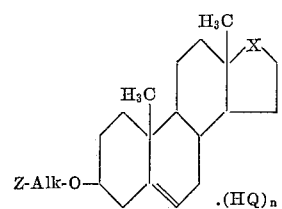

and 5,6-dihydro compounds corresponding, Z, Alk, and X being defined as before; Q representing one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $n$ representing 1 except when Z comprises a piperazino or other dibasic amino radical, in which case $n$ represents either 1 or 2.

The compounds to which this invention relates are useful because of their valuable pharmacological properties. For instance, they are anti-cholesterologenic agents, and adapted to inhibit cholesteremia in the animal body. They also manifest desirable anorectic activity and inhibit the growth of *B. subtilis* and *Trichophyton mentagrophytes* in recognized assays for these latter antibacterial and anti-fungal effects.

Manufacture of the claimed products proceeds by heating together, preferably in an inert solvent and with an alkaline catalyst such as sodium iodide present, a steroid of the formula

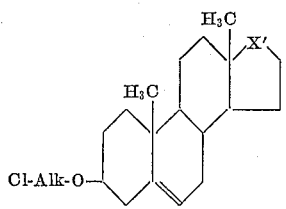

and an amine of the formula

Alk and Z in the formulas being defined as before and X′ representing a carbonyl or acetonylidene (CH$_3$COCH<)

radical, to obtain a product of the formula

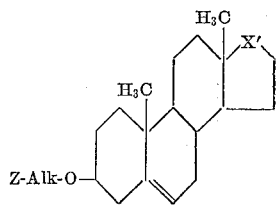

wherein Z, Alk, and X' are defined as before. This product, in turn, is converted to a corresponding 5(6) dihydro compound by low pressure hydrogenation catalyzed with platinum oxide and using acetic acid as the reaction medium. During the course of the hydrogenation, the oxo substituent is also reduced, giving rise to a mixed (α and β) alcohol which affords the corresponding 5,6-dihydro ketone upon oxidation with, for example, chromium trioxide and sulfuric acid in acetone. Finally, a 17-oxo product

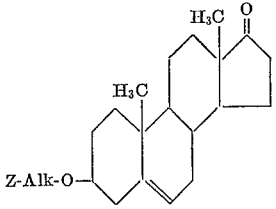

(Z and Alk in the formula having the meanings previously assigned) is converted to the corresponding 17-ol by interaction, for the most part at temperatures of the order of 0–5°, with lithium tri-tert-butoxy aluminum hydride in tetrahydrofuran. Those skilled in the art will recognize that the 5(6) double bond in the resultant product is amenable to hydrogenation by the same procedure described above as applied to 17-oxo and 20-oxo compounds of the invention.

Conversion of the amine bases hereof to corresponding acid addition salts is accomplished by simple admixture of these compounds with either 1 or 2 equivalents of any of various inorganic and strong organic acids, the anionic portion of which conforms to Q as hereinabove defined.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Infrared absorption data refer to determinations made in chloroform solution.

EXAMPLE 1

A. *3β-(3-chloropropoxy)-pregn-5-en-20-one*

Approximately 42 parts of 3β-(p-toluenesulfonyloxy) pregn-5-en-20-one [obtained as described by Butenandt et al., Ber., 70, 1446 (1937)] is dissolved in 330 parts of 3-chloropropanol at temperatures below 40°; and the resultant solution is maintained at room temperatures for 48 hours, then mixed with 3000 parts of ice water. The mixture thus obtained is extracted with ether. The extract is consecutively washed with dilute aqueous sodium carbonate, water, and saturated brine, then dried over anhydrous sodium sulfate, and is finally stripped of solvent and unreacted chloroalkanol by heating in vacuo at about 50°. The residue is the desired 3β-(3-chloropropoxy) pregn-5-en-20-one, which is characterized by principal absorption bands in the infrared spectrum at 5.82, 9.03, 9.30, and 9.45μ.

B. *3β-(3-dimethylaminopropoxy)pregn-5-en-20-one*

To a mixture of 18 parts of 3β-(3-chloropropoxy) pregn-5-en-20-one and 14 parts of anhydrous sodium iodide in 400 parts of butanone at −10° is added a solution of 14 parts of dimethylamine in 40 parts of toluene. The resultant mixture is heated in a sealed vessel at 60–65° for 40 hours, then stripped of solvent by vacuum distillation. The residue is taken up in ether. The ether solution is successively washed with dilute aqueous sodium carbonate, water, and brine, whereupon it is dried over anhydrous sodium sulfate and freed of solvent by distillation. The residue is 3β-(3-dimethylaminopropoxy)pregn-5-en-20-one, which is characterized by principal absorption bands in the infrared spectrum at 5.81, 9.01, 9.42, and 9.78μ. The product has the formula

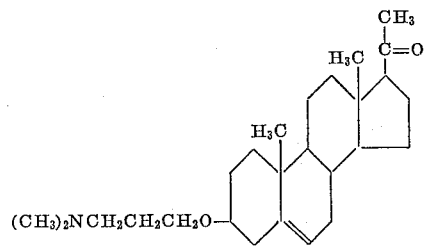

EXAMPLE 2

A. *3β-(2-chloroethoxy)pregn-5-en-20-one*

Substitution of 280 parts of 2-chloroethanol for the 3-chloropropanol called for in Example 1A affords, by the procedure there detailed, 3β-(2-chloroethoxy)pregn-5-en-20-one, characterized by principal absorption bands in the infrared spectrum at 5.81, 9.01, 9.32, and 9.50μ.

B. *3β-(2-diethylaminoethoxy)pregn-5-en-20-one*

A mixture of 10 parts of 3β-(2-chloroethoxy)pregn-5-en-20-one, 6 parts of diethylamine, 7 parts of sodium iodide, and 240 parts of acetone is heated in a sealed vessel at 60–65° for 24 hours, whereupon solvent is removed by vacuum distillation and the residue is taken up in ether. The ether solution is successively washed with dilute aqueous sodium carbonate, water, and brine, then dried over anhydrous sodium sulfate. Upon evaporation of solvent, there is obtained as the residue, 3β-(2-diethylaminoethoxy)pregn-5-en-20-one, characterized by principal absorption bands in the infrared spectrum at 5.83, 8.98, 9.45, and 9.70μ. The product has the formula

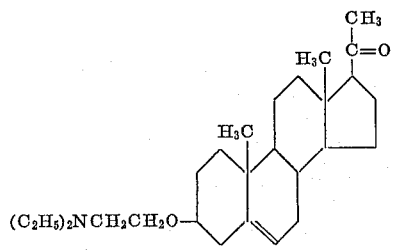

EXAMPLE 3

*3β-(2-pyrrolidinoethoxy)pregn-5-en-20-one*

To a solution of 40 parts of 3β-(2-chloroethoxy)pregn-5-en-20-one in 1100 parts of dry redistilled acetone is added 18 parts of pyrrolidine and 30 parts of sodium iodide. The resultant mixture is heated at the boiling point under reflux in an atmosphere of nitrogen with agitation for 20 hours, then stripped of solvent by vacuum distillation. The residue is extracted with ether. The ether extract is consecutively washed with dilute aqueous sodium carbonate, water, and brine, following which it is dried over anhydrous sodium sulfate and then freed of solvent by distillation. The residue is the desired 3β-(2-pyrrolidinoethoxy)pregn-5-en-20-one, of the formula

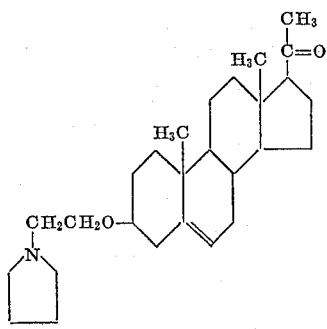

EXAMPLE 4

A. 3β-(3-pyrrolidinopropoxy)pregn-5-en-20-one

To a solution of 9 parts of 3β-(3-chloropropoxy)pregn-5-en-20-one in 240 parts of dry redistilled acetone is added 4 parts of pyrrolidine and 7 parts of sodium iodide. The resultant mixture is heated at the boiling point under reflux in a nitrogen atmosphere with agitation for 20 hours, then concentrated to approximately ⅛ its original volume by distillation. The concentrate is mixed with approximately 3600 parts of cold aqueous 5% sodium carbonate, and the mixture thus obtained is held at 5–10° for 4 hours. The solid precipitate which results is filtered off and taken up in ether. The ether solution is consecutively washed with dilute aqueous sodium carbonate, water, and brine, then dried over anhydrous sodium sulfate. Upon distillation of solvent, there remains as the residue, 3β-(3-pyrrolidinopropoxy)pregn=5-en-20-one, of the formula.

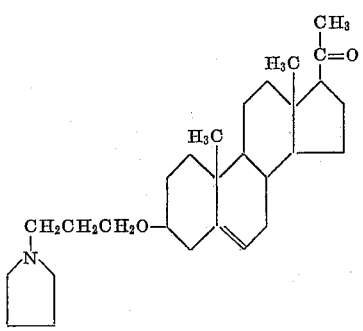

B. 3β-(3-pyrrolidinopropoxy)pregn-5-en-20-one hydrochloride

To a solution of 10 parts of 3β-(3-pyrrolidinopropoxy)-pregn-5-en-20-one in 140 parts of anhydrous ether is added just sufficient hydrogen chloride dissolved in 2-propanol to induce acidity. The precipitate thrown down, filtered off and recrystallized from a mixture of ethanol and ethyl acetate, affords 3β - (3 - pyrrolidinopropoxy) pregn-5-en-20-one hydrochloride as fine needles melting at 213–215°.

EXAMPLE 5

3β-(3-piperidinopropoxy)pregn-5-en-20-one

Substitution of 40 parts of 3β-(3-chloropropoxy)pregn-5-en-20-one and 20 parts of piperidine for the 3β-(2-chloroethoxy)pregn-5-en-20-one and pyrrolidine, respectively, called for in Example 3 affords, by the procedure there detailed, 3β-(3-piperidinopropoxy)pregn-5-en-20-one, which is characterized by principal absorption bands in the infrared spectrum at 5.81, 9.02, 9.42 and 9.70μ. The product has the formula

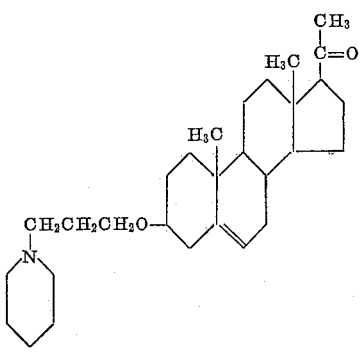

EXAMPLE 6

3β-[3-(4-methylpiperazino)propoxy]pregn-5-en-20-one

Substitution of 40 parts of 3β-(3-chloropropoxy)pregn-5-en-20-one and 20 parts of N-methylpiperazine for the 3β-(2-chloroethoxy)pregn-5-en-20-one and pyrrolidine, respectively, called for in Example 3 affords, by the procedure there detailed, 3β - [3-(4 - methylpiperazine)propoxy]pregn-5-en-20-one, which is characterized by principal absorption bands in the infrared spectrum at 5.81, 8.99, 9.35 and 9.80μ. The product has the formula

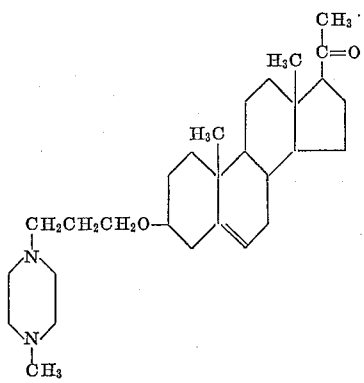

EXAMPLE 7

3β-(3-pyrrolidinopropoxy)-5α-pregnan-20-ol

To a solution of 17 parts of 3β-(3-pyrrolidinopropoxy)pregn-5-en-20-one in 400 parts of glacial acetic acid is added 1 part of platinum oxide. The resultant mixture is maintained with agitation at room temperatures under approximately 3 atmospheres of hydrogen until hydrogen uptake indicates that reduction of the Δ$^5$ double bond and 20-oxo group is complete (representatively, in about 5 hours). The mixture is then filtered, and the filtrate is freed of acetic acid by vacuum distillation. The residue is taken up in 2000 parts of ether; and the ether solution is successively washed with dilute aqueous sodium carbonate, water, and brine, following which it is dried over anhydrous sodium sulfate and finally stripped of solvent by distillation. The residue thus obtained is a mixture of the 20α and 20β 3β-(3-pyrrolidinopropoxy)-5α-pregnan-20-ol epimers, having the formula

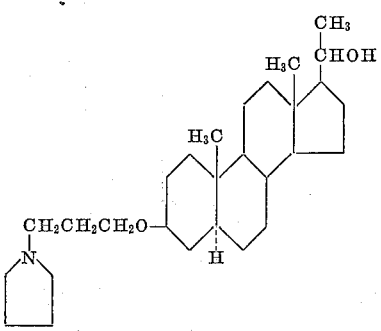

EXAMPLE 8

3β-(3-pyrrolidinopropoxy)-5α-pregnan-20-one

To a solution of 15 parts of 3β-(3-pyrrolidinopropoxy)-5α-pregnan-20-ol in 1200 parts of acetone is added, with agitation at approximately 20° in an atmosphere of nitrogen during approximately 5 minutes, a solution of 10 parts of chromium trioxide and 14 parts of concentrated sulfuric acid in 14 parts of water. Agitation is continued for 2 minutes after the addition is complete and then for 5 minutes while 125 parts of 2-propanol is introduced. The resultant mixture is concentrated to approximately ¼ its original volume by vacuum distillation, and the concentrate is poured into 4000 parts of water. The mixture thus obtained is extracted with dichloromethane. The dichloromethane extract is consecutively washed with water and brine, then dried over anhydrous sodium sulfate and stripped of solvent by vacuum distillation. There remains as the residue 3β-(3-pyrrolidinopropoxy)-5α-pregnan-20-one, having principal absorption bands in the infrared spectrum at 5.83, 9.02, 9.37, and 9.76μ. The product has the formula

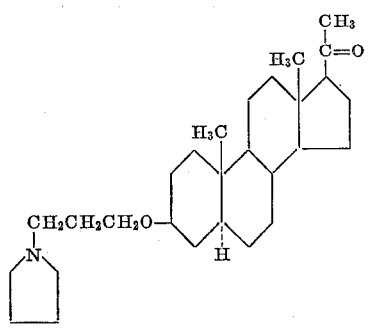

EXAMPLE 9

A. *3β-(3-chloropropoxy)androst-5-en-17-one*

A solution of 75 parts of 3β-(p-toluenesulfonyloxy)androst-5-en-17-one [obtainable as described by Butenandt et al., Ber., 75, 591 (1941)] in a mixture of 155 parts of 3-chloropropanol and 260 parts of redistilled benzene is heated at 70–75° for 90 minutes, then diluted with 1750 parts of ether. The resultant solution is successively washed with water, dilute aqueous sodium carbonate, water, and brine, then dried over anhydrous sodium sulfate, and stripped of solvent and unreacted haloalkanol by vacuum distillation. There remains as the residue 3β-(3-chloropropoxy)androst-5-en-17-one, characterized by principal absorption bands in the infrared spectrum at 5.74, 9.06, 9.30, 9.45, and 9.74μ, B. *3β-(3-dimethylaminopropoxy)androst-5-en-17-one*

Substitution of 17 parts of 3β-(chloropropoxy)androst-5-en-17-one for the 3β-(3-chloropropoxy)pregn-5-en-20-one called for in Example 1B affords, by the procedure there detailed, 3β-(3-dimethylaminopropoxy)androst-5-en-17-one, which is characterized by principal absorption bands in the infrared spectrum at 5.75, 9.05, 9.47, and 9.78μ. The product has the formula

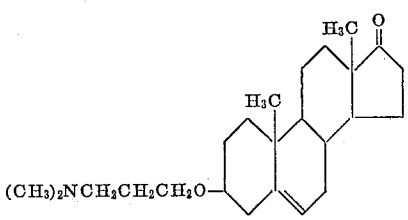

EXAMPLE 10

A. *3β-(3-pyrrolidinopropoxy)androst-5-en-17-one*

Using the procedure of Example 4A, but substituting 58 parts of 3β-(3-chloropropoxy)androst-5-en-17-one, 21 parts of pyrrolidine, 37 parts of sodium iodide, and 1200 parts of dry redistilled acetone for the 9 parts of 3β-(3-chloropropoxy)pregn-5-en-20-one, 4 parts of pyrrolidine, 7 parts of sodium iodide, and 240 parts of dry redistilled acetone, respectively, called for therein, one obtains 3β-(3-pyrrolidinopropoxy)androst-5-en-17-one, of the formula

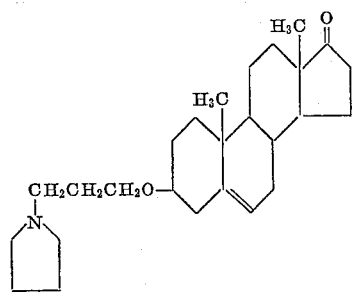

B. *3β-(3-pyrrolidinopropoxy)androst-5-en-17-one hydrochloride*

An anhydrous ethereal solution of 3β-(3-pyrrolidinopropoxy)androst-5-en-17-one, made acid with absolute 2-propanolic hydrogen chloride, precipitates 3β-(3-pyrrolidinopropoxy)androst-5-en-17-one hydrochloride which, filtered off and recrystallized from absolute ethanol, is obtained as fine needles melting at approximately 254–255°.

EXAMPLE 11

*3β-(3-pyrrolidinopropoxy)androst-5-en-17β-ol*

To a solution of 25 parts of lithium tri-tert-butoxy aluminum hydride in 420 parts of purified tetrahydrofuran is added, with agitation at 0–5° during approximately 2 hours, a solution of 10 parts of 3β-(3-pyrrolidinopropoxy)androst-5-en-17-one in 420 parts of purified tetrahydrofuran. The resultant mixture is maintained at 0–5° for a further 30 minutes after the addition is complete, then at 25° for 1 hour, agitation being continued the while. It is then cautiously mixed with 6000 parts of cold, aqueous, 10% Rochelle salt; and the mixture thus obtained is extracted with ether. The extract is washed successively with aqueous 10% Rochelle salt and water, then dried over anhydrous sodium sulfate and filtered. Evaporation of solvent affords as the residue 3β-(3-pyrrolidinopropoxy)androst-5-en-17β-ol, which is characterized by principal absorption bands in the infrared spectrum at 2.74, 9.04, 9.45, and 9.75μ. The product has the formula

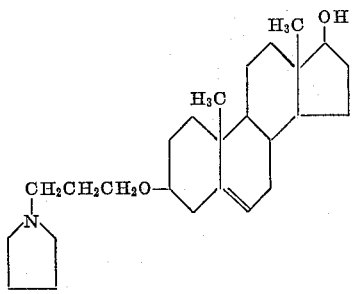

What is claimed is:
1. A compound selected from the group consisting of compounds of the formula

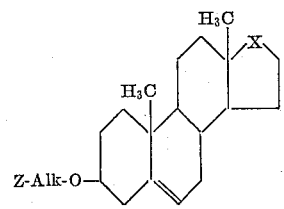

and 5α,6-dihydro compounds corresponding thereto, Z in the formula being selected from the group consisting of di(lower alkyl)amino and saturated cyclic amino radicals, said saturated cyclic amino radicals being attached to Alk via nitrogen and comprising at least 4 and fewer than 6 carbon atoms; Alk in the formula being a lower alkylene radical; and X in the formula being selected from the group consisting of radicals of the formula

wherein R is selected from the group consisting of hydroxy acetyl, and 1-hydroxyethyl radicals.

2. A compound selected from the group consisting of those having the formula

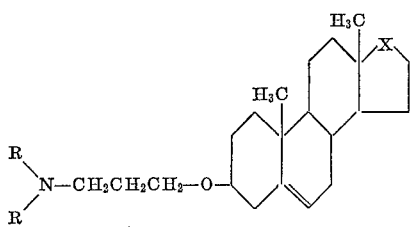

wherein X is selected from the group consisting of carbonyl and β-hydroxymethylene, and

is selected from the group consisting of

and

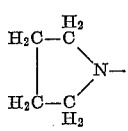

and the mineral acid addition salts thereof.

3. A compound selected from the group consisting of compounds having the formula

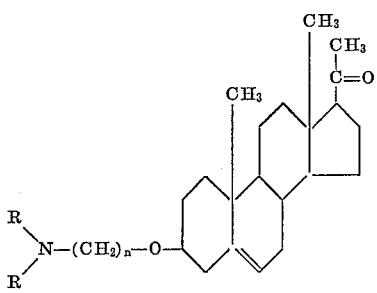

wherein n has a value of 2 to 3 and wherein

is selected from the group consisting of

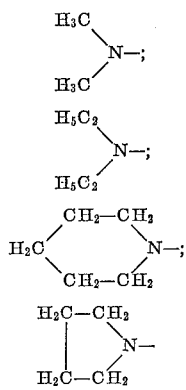

and the mineral acid addition salts thereof.

4. A compound of the formula

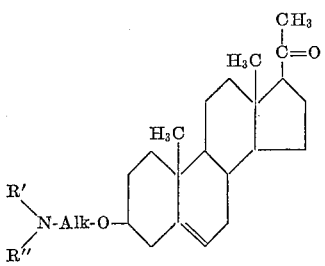

wherein R' and R" are lower alkyl radicals and Alk is a lower alkylene radical.

5. 3β-(3-dimethylaminopropoxy)pregn-5-en-20-one.

6. A compound of the formula

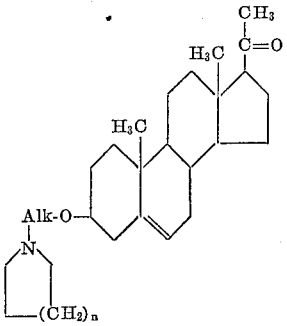

wherein n is a positive integer less than 3 and Alk is a lower alkylene radical.

7. 3β-(3-pyrrolidinopropoxy)pregn-5-en-20-one.
8. 3β-[3-(4 - methylpiperazino)propoxy]pregn-5-en-20-one.
9. 3β-(3-pyrrolidinopropoxy)-5α-pregnan-20-one.
10. 3β-(3-pyrrolidinopropoxy)androst-5-en-17-one.
11. 3β-(-3-pyrrolidinopropoxy)androst-5-en-17β-ol.

No references cited.

LEWIS GOTTS, *Primary Examiner.*

LESLIE H. GASTON, MORRIS LIEBMAN, *Examiners.*